United States Patent [19]
Burton

[11] 4,022,001
[45] May 10, 1977

[54] GRAPE HARVESTER

[75] Inventor: Charles G. Burton, Lewiston, N.Y.

[73] Assignee: Chisholm-Ryder Company, Inc., Niagara Falls, N.Y.

[22] Filed: Feb. 3, 1975

[21] Appl. No.: 546,284

[52] U.S. Cl. ............................................. 56/330
[51] Int. Cl.² ...................................... A01D 46/00
[58] Field of Search .............. 56/330, 331, 328 R, 56/28, 29, 33

[56] References Cited
UNITED STATES PATENTS

| | | | |
|---|---|---|---|
| 3,328,944 | 7/1967 | Shepardson | 56/331 |
| 3,449,895 | 6/1967 | Pertics | 56/330 |
| 3,492,801 | 2/1970 | Olmo et al. | 56/330 |
| 3,611,689 | 10/1971 | Patzlaff | 56/330 |
| 3,613,343 | 10/1971 | Sagouspe et al. | 56/330 |
| 3,685,266 | 8/1972 | Mohn | 56/330 |
| 3,774,381 | 11/1973 | Burton | 56/330 |
| 3,890,775 | 6/1975 | Bruel | 56/330 |

Primary Examiner—Russell R. Kinsey
Attorney, Agent, or Firm—Joseph P. Gastel

[57] ABSTRACT

A grape harvester for harvesting grapes from vines grown in various formations such as single curtain, T-top, slant top, and double curtain formation having spaced first and second cordon wires supporting spaced curtains including a frame, spaced first and second arms mounted toward the front of the frame for beating a respective curtain, and spaced first and second wire strikers mounted on third and fourth arms located toward the rear of the frame for striking a respective cordon wire which supports each curtain. The first and second arms may be removed when harvesting formations other than the double curtain, or may have additional wire strikers mounted thereon, or all of the arms without any wire strikers may be used for harvesting single curtain formations.

28 Claims, 9 Drawing Figures

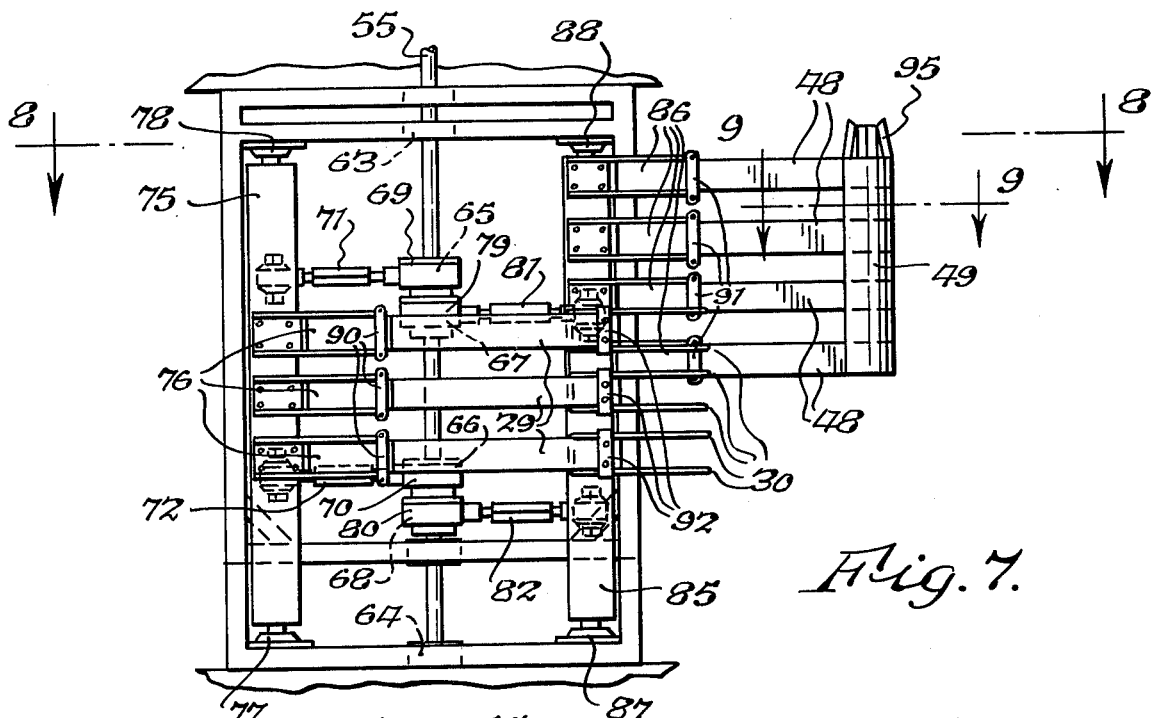
Fig. 7.
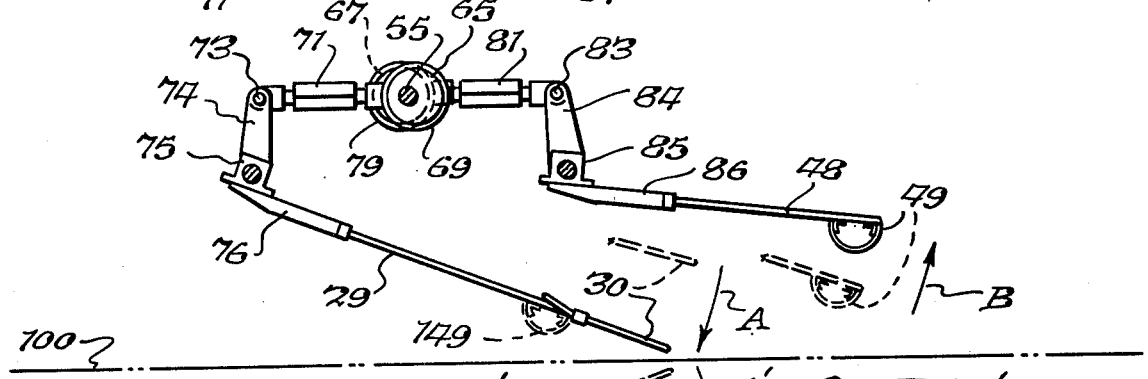
Fig. 8.
Fig. 9.
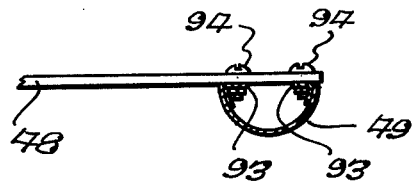

GRAPE HARVESTER

The present invention relates to a improved grape harvester which is readily convertible for harvesting either signal curtain formations or Geneva double curtain vine formations, or other formations.

By way of background, in a signal curtain grapevine formation, the grapevines are grown on wires extending between posts in a row. Harvesting with a harvester of the type depicted is effected by first and second pairs of arms, with or without fingers at the ends thereof, which engage opposite sides of the single curtain or remove grapes therefrom. However, this type of harvester as set up for signal curtain harvesting, cannot be used to harvest Geneva double curtain vine formations wherein the grapevines are trained to grow along two horizontally spaced parallel wires so that the vines form two spaced vertical parallel curtains. In a formation of this type the graps not only grow on the curtains, but also on internal portions of the vines which are located well within the boundary defined by the curtains. In addition, grapes also grow proximate central supporting posts which support the cordon wires. It is difficult to reach the grapes which are located well within the curtains, and in addition it is extremely difficult to loosen the grapes from the curtains because they yield when struck because they are suspended only at the upper portions thereof. In addition, in other types of growth formations, such as T-top and slant top formations wherein the grapevines grow on horizontally spaced suspended wires, the same problems exist as with a Geneva double curtain formation in that most of the grape growth is confined inwardly of the spaced horizontal wires. It is with the overcoming of the foregoing deficiencies of the prior art that the present invention is concerned.

It is accordingly one object of the present invention to provide an improved grape harvester for harvesting grapes from Geneva double curtain formations and other growth formations in an extremely efficient and thorough manner and which can be converted easily and quickly from being set up for harvesting one type of formation to being set up for harvesting another type of formation.

Another object of the present invention is to provide an improved harvester for harvesting grapes by a combined vine-engaging and wire-striking action. Other objects and attendant advantages of the present invention will readily be perceived hereafter.

The present invention relates to a grape harvester for harvesting grapes from vines grown on first and second curtains on spaced first and second cordon wires and comprises a frame, first and second vine engaging means, first mounting means for mounting said first and second vine engaging means on said frame, first driving means for driving said first and second vine engaging means to cause said first and second vine engaging means to engage said first and second curtains, respectively, to thereby remove grapes therefrom, first and second wire striker means, second means for mounting said first and second wire striker means on said frame, and second driving means for causing said first and second wire striker means to strike said first and second wires, respectively, to thereby produce a combined vine engaging and wire striking action to remove grapes from said vines.

The present invention also relates to a harvester for harvesting grapes including a frame, vine engaging means on said frame for engaging grapevines to harvest grapes therefrom, wire striker means, and means for selectively mounting said wire striker means on said vine engaging means to convert said vine engaging means to wire striking means. In accordance with a more specific aspect of the invention, additional wire striking means can be mounted longitudinally along the axis of said frame from the other wire striker means.

The present invention also relates to a harvester for harvesting from a wire-supported vine formation extending in a row comprising a frame, vine engaging means, first mounting means for mounting said vine engaging means on said frame, first driving means for driving said vine engaging means into engagement with said vine formation, wire striker means, second mounting means for mounting said wire striker means on said frame, and second driving means for driving said wire striking means into engagement with said wire to thereby produce a combined vine-engaging and wire-striking action to effect harvesting from said vine formation.

The various aspects of the present invention will be more fully understood when the following portions of the specification are read in conjunction with the accompanying drawings wherein:

FIG. 7 is a fragmentary view, with certain portions omitted, taken substantially along line 7—7 of FIG. 5 and illustrating the various linkages associated with the beater arms and wire strikers;

FIG. 8 is a fragmentary view, partially in cross section, taken substantially along line 8—8 of FIG. 7 and showing the orientation in plan between the beater arms and the wire strikers and also showing the linkage for driving them; and FIG. 9 is a fragmentary cross section view taken substantially along line 9—9 of FIG. 7 and showing the structure of the wire strikers.

Figures 2, 3:
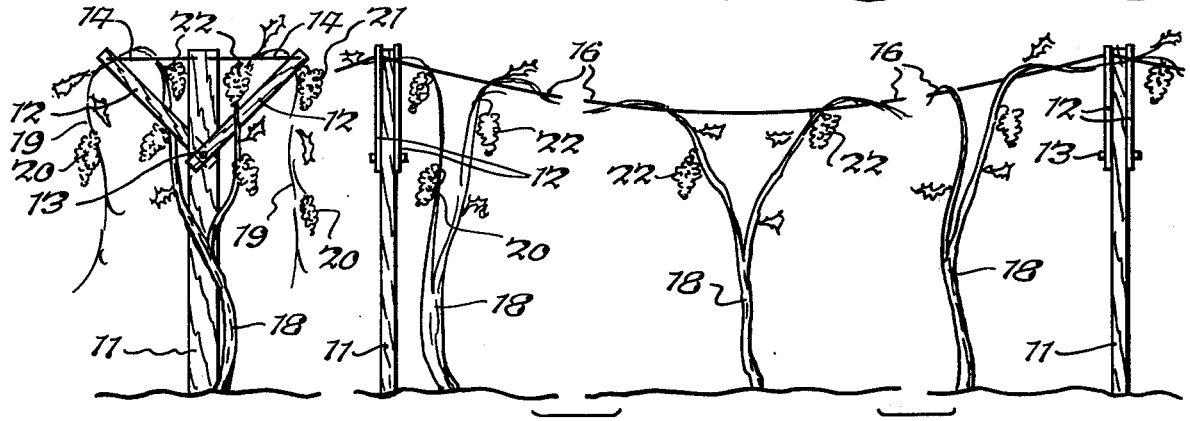
FIG. 2 is an end elevational view of a supporting post construction for a Geneva double curtain type of grape vine formation.
FIG. 3 is a fragmentary side elevational view of the Geneva double curtain vine formation.
Figure 4:
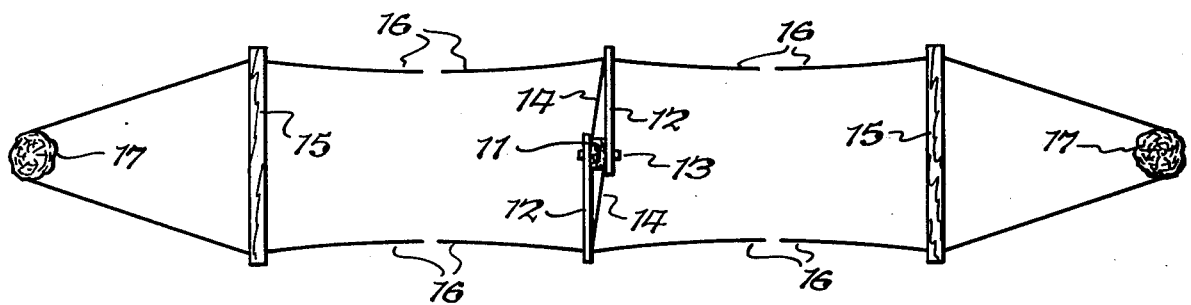
FIG. 4 is a fragmentary plan view of the supporting structure for the Geneva double curtain type of vine formation.

Summarizing in advance, the improved harvester 10 of the present invention can be used for any type of grape formation including signal curtain, slant-top, or T-top, but as shown in the drawings is set up for the purpose of harvesting grapes grown in a Geneva double curtain formation shown in FIGS. 2, 3 and 4. When the harvester is set up for single curtain harvesting, where the grapevines are supported on wires extending between posts, the harvesting is effected by arms 29–29', as described hereafter, and by rearwardly extending arms 48–48' which do not carry wire strikers 49–49' thereon. In a single curtain harvesting set-up, the horizontal arms 29–29' and 48–48' extend in substantially vertical rows and are spaced apart the proper distance on opposite sides of the curtain. To convert the single curtain set-up for harvesting the Geneva double curtain formation, wire strikers 49–49' are mounted on arms 48–48' and the modules 26–26' are inclined so that the wire strikers 49–49' will have a vertical upward force component in striking wires 16. The same set-up which is used for harvesting the Geneva double curtain can be used for the T-top or slant top formation, and with the latter, only the wire striker portions of the machine need be used if there are no appreciable curtains. Because of the structure of the machine, conversion thereof to pick different growth formations can be effected simply and quickly.

In the Geneva double curtains formation, spaced support posts 11 are provided, each having a pair of inclined arms 12 having their lower ends pivotally secured to post 11 by pin 13 and having their upper portions secured to the top of posts 11 by means of wires 14. The inner ends of the wires are fixedly secured to the posts so that arms 12 can pivot toward the posts but will be prevented from pivoting away from the posts when wires 14 are taut. Horizontally spaced cordon wires 16 are suspended from the outer ends of arms 12. As will be appreciated, there are numerous posts 11 located in a row. Between the last post 11 and the end of the row a spreader bar 15 is placed between cordon wires 16, and the cordon wires are thereafter secured to posts 17 at the ends of the row.

As can be visualized from FIGS. 2 and 3, the main trunks 18 of grapevines grow generally in line with posts 11, and the cane and upper portions of the vines form two generally parallel curtains 19 with each curtain hanging from an associated cordon wire 16. Each cordon wire 16 will have a normal drape between arms 12 of adjacent posts 11 due to gravity and due to the weight of the vines. The cordon wires 16 will also converge toward each other (FIG. 4) between their points of suspension on adjacent arms 12 because of the inward pull exerted by the vines. In the vine formation (FIG. 2) there will be bunches of grapes 20 on the curtains 19 and there will be bunches of grapes, such as 21, proximate the cordon wires, and there will also be bunches of grapes, such as 22, located inwardly toward the centerline of posts 11. Harvester 10 of the present invention efficiently removes grapes from all of the locations on the Geneva curtain formation.

Broadly, harvester 10 includes a inverted U-shaped frame 23 mounting a pair of front wheels 24 and a pair of rear wheels 25. The harvester is driven by an engine 26 mounted on top of frame 23, and the operator sits in the seat 27 and steers the harvester in straddling relationship to a row of grapevines by manipulating steering wheel 28 which is suitably coupled to front wheels 24 through a appropriate linkage.

As the harvester 10 moves along the row of grapevines, the beater arms 29–29', having picking fingers 30–30', respectively, at the ends thereof, the combination of which is considered vine-engaging means, will alternately move inwardly and upwardly and attack the curtains 19 with a combined beating and stripping action to action to cause grapes to fall on catcher leaves 31–31' at the bottom of the harvester. Catcher leaves 31–31', which extend substantially from the front of the harvester to the rear thereof, are retractible when they engage posts 12, as is well understood. Thereafter the grapes pass onto conveyors 32–32' which move them rearwardly to first elevator conveyors 33–33', which in turn move them onto second elevator conveyors 34–34'. Thereafter the grapes pass onto a delivery conveyor 35 which drops them into containers mounted on a truck which travels in parallel relationship wth harvester 10 along the row of grapevines.

At this point, it is to be noted that the opposite longitudinal halves of the harvester are essentially mirror image counterparts of each other. Therefore, in the interest of brevity, certain elements of structure will be designated with primed numerals which will represent mirror-image counterparts of structure designated by unprimed numerals.

Figure 1:
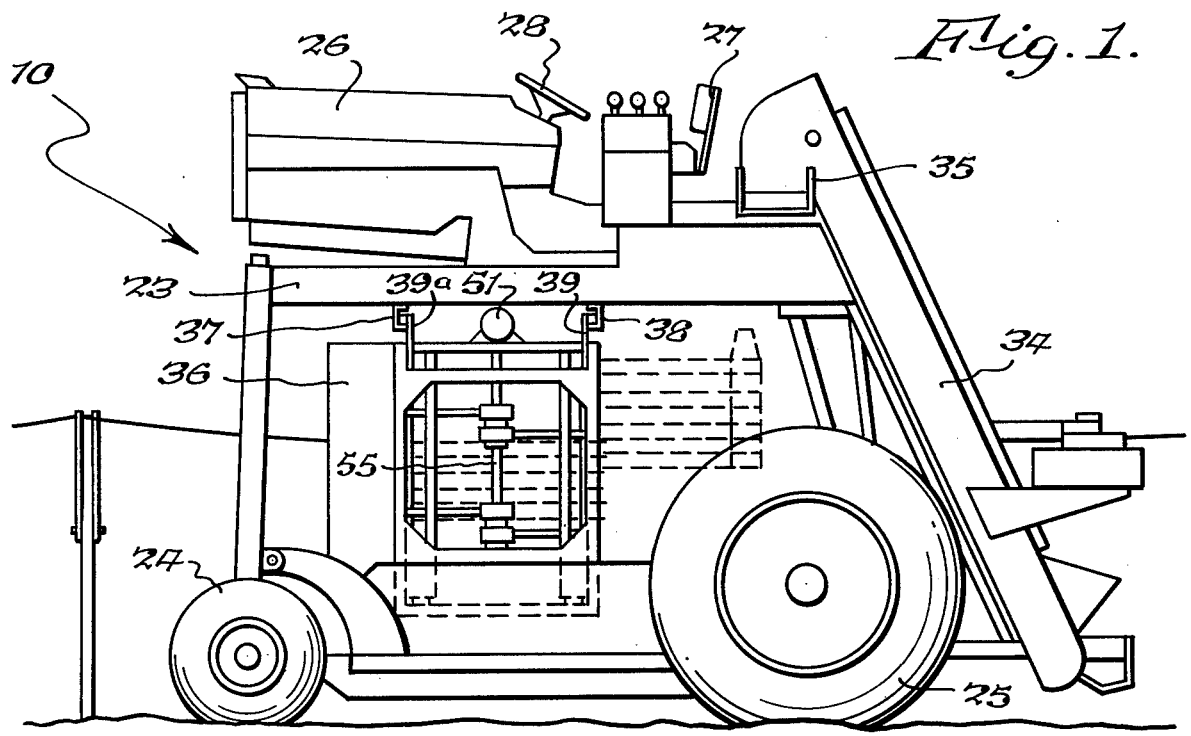
FIG. 1 is a side elevational view of the improved grape harvester of the present invention.

The beater arms 29–29' are mounted on modules 36–36' which are suspended from machine frame portions 37–38 in the nature of channels (FIG. 1) by means of spaced brackets 39–39' on frame portion 38 and mirror-image counterparts, such as 39a on frame portion 37. More specifically, brackets 39–39' and their counterparts are mounted on frame portions 37–38 by means such as rollers 40 which permit the bracket 39 and its counterpart 39a, which support module 36, to be moved toward and away from bracket 39' and its counterpart as required to vary the spacing between modules 36 and 36'. Suitable structure (not shown) may be used to clamp brackets 39–39' and their counterparts on frame member 37 to their respective frame members 37–38 in any desired position, or the brackets may float on frame members 37–38. The modules have tabs 41 secured to the inner ends thereof which in turn are pivotally secured to a pair of spaced brackets, such as 39 and its counterpart, by means of pins 42. The modules also have tabs 43 secured thereto which receive pins 44 which extend through tabs 43 and any one of the apertures such as 45, 46 or 47 in bracket 39 and its counterpart, or through apertures 45', 46' or 47' in bracket 39' or its counterpart. By means of this construction the angle of inclination of modules 36–36' may be adjusted to an optimum position.

Figure 6:
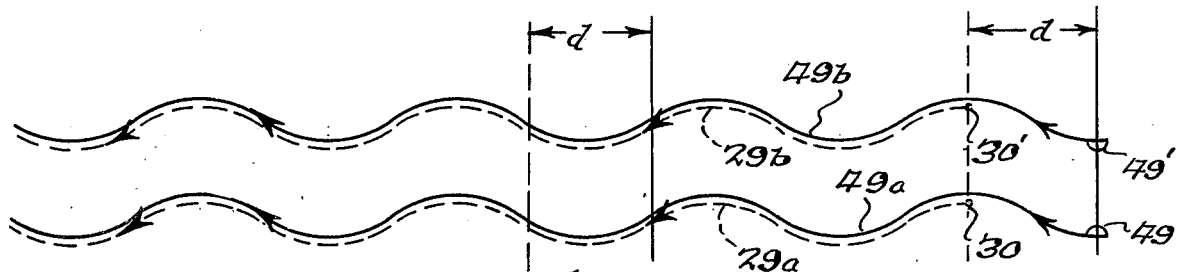
FIG. 6 is a diagrammatic representation of the paths followed by the beater arms and the wire strikers.

Modules 36–36' also mount arms 48–48' which carry wire striker members 49–49' at their outer ends. Thus, the modules carry both the beater arms 29–29' and the striker members 49–49'. As mentioned above, the beater arms attack the grapes with a beating and a stripping action. The striker members peridically strike the cordon wires to aid in the removal of grapes. Both the beater arms 29–29' and the striker members 49–49' effect their striking action in a direction which has both an inward horizontal and an upward vertical component, as this aids in grape harvesting because the vertical component works against the force of gravity tending to hold the grapes down. In addition, in the disclosed drive construction arms 29–29' simultaneously pivot in the same direction while arms 48–48' simultaneously pivot in the opposite direction. In FIG. 6 dotted lines 29a and 29b depict the path traveled by the outer ends of arms 29 and 29', respectively, and solid lines 49a and 49b depict the paths traveled by the wire strikers 49 and 49', respectively, with the exact positions of the outer ends of arms 29–29' relative to beaters 49–49' at any instant being determinable by considering them spaced a distance $d$ from each other. Arms 29–29' will be 180° out of phase with arms 48–48' so that when arms 29 are at their most inward point of travel relative to a curtain on one side, striker member 49' will be at its most inward travel relative to its associated wire 16 on the opposite side, and at the same time arms 29' will be at their most remote position relative to their associated curtain and striker 49 will be at its most remote position relative to its associated wire. The foregoing relationship is shown in solid lines in FIG. 8. The dotted lines in FIG. 8 show the positions of the arms 29–29' and 48–48' at the opposite extreme of the cycle. Stated otherwise, the beating and striking action is such that one curtain 19 receives its maximum impact from the beater arms 29 or 29' while the cordon wire on the opposite side of the vine formation receives its maximum impact from the striker member 49 or 49'. Thus, a torque shock is periodically applied to opposite portions of the vine formation which are spaced the same distance as the distance between the ends of the arms 29 and 48.

In order to obtain the foregoing combined vine beating and wire striking action, the following structure is provided. A hydraulic motor 51, which is powered from a suitable hydraulic pump (not shown), has an output shaft 52 mounting bevel gear 53 which is in mesh with bevel gear 54 mounted on the end of shaft 55 (FIGS. 5 and 7) suitably journalled in module 36. The end of shaft 52 is connected to an internally spline tube 58 at universal 57 and a splined shaft 56 is received in telescoping relationship within splined tube 58, said shaft 56 having universal 59 at the end thereof coupled to shaft 60 mounting bevel gear 61 which is in mesh with bevel gear 62 keyed to shaft 55', which is the counterpart of shaft 55. Bearing boxes 140 and 140' mount shafts 52 and 60, respectively. It can thus be seen that the rotation of motor 51 will cause rotation of shafts 55 and 55'.

At this point it is to be again noted that modules 36 and 36' and all of their parts are essentially mirror-image counterparts of each other. Therefore the description of the drive arrangement will be confined to the structure associated with module 36 (FIG. 7) and it will be understood that the mirror-image structure associated with module 36' operates in an analogous manner. Shaft 55 is suitably journalled in module 36 by bearings 63 and 64. The various arms 29 and 48 are oscillated back and forth because they are driven by suitable eccentric drives from shaft 55. In this respect, there are two pairs of eccentrics on shaft 55, pair 65–66 and pair 67–68, which are 180° out of phase with pair 65–66. Collars 69 and 70 on eccentrics 65 and 66, respectively, are connected to turnbuckle rods 71 and 72, respectively, which in turn are pivotally connected at pivot points such as 73 (FIG. 8) to arms 74 of bellcrank lever 75 having other arms 76 which support beater arms 29. Bellcrank lever 75 is journalled in bearings 77 and 78 mounted on module 36. Collars 79 and 80 which are mounted on eccentrics 67 and 68, respectively, (FIG. 7) are connected to turnbuckle linkages 81 and 82, respectively, which in turn are pivotally connected at 83 to arms 84 of bellcrank lever 85 having arms 86 which mount striker arms 48. Bellcrank lever 85 has its opposite ends journalled in bearings 87 and 88 on module 36. By virtue of the foregoing arrangement, especially the eccentrics which are 180° out of phase with each other, the above described relative opposite motion of arms 29 and 48 is obtained so that when arms 29–29' are traveling clockwise in the direction of arrows A and A' in FIG. 8, arms 48–48' are traveling counterclockwise in the direction of arrows B and B' and vice versa. The throw of the various arms is between the solid and dotted line positions. Furthermore, the centerline of the machine is depicted by numeral 100, but the distances between arms 29 and 29' and between arms 48 and 48' are not to scale.

Structure which is analogous to that described above for driving arms 29 and 48 is also used for driving arms 29' and 48'. However, a detailed description of this structure will be omitted in the interest of brevity, especially considering that this structure is a mirror-image of and analogous to the structure described above relative to FIGS. 7 and 8. However, primed numerals have been applied in the various figures, and these represent structure which are the counterparts of the structure represented by the unprimed numerals. It will be appreciated, however, that the eccentrics which drive arms 29' are 180° out of phase with the eccentrics which drive arms 29, and further the eccentrics which drive arms 48' are 180° out of phase with the eccentrics which drive arms 48. Thus, the eccentrics which drive arms 29 will be in phase with the eccentrics which drive arms 48°, and the eccentrics which drive arms 29' will be in phase with the eccentrics which drive arms 48.

At this point it is to be noted that the bellcranks, such as 75–75' and 85–85', which are centers of pivotal action for the various arms 29–29' and 48–48', respectively, are parallel to their respective shafts 55 and 55' and are inclined downwardly and inwardly because the modules are inclined in this direction. Therefore, as noted above, the striking action of the beater arms 29–29' and the striker arms 48–48' will have a upward component working against the force of gravity pulling the vines and the cordon wires, respectively, downwardly. The arms 29 are suitably attached to arms 76 of bellcrank lever 75 by means of brackets 90. Arms 48 are connected to arms 86 by means of brackets 91. All of the arms 29–29' and 48–48' are elongate, slender, rectangular members which have a degree of flexibility so that they can yield as required during the harvesting operation. Fingers 30 are attached to the ends of arms 29 by means of brackets 92, and as noted above, these fingers extend in the direction of arms 29 and lie substantially parallel to the longitudinal axes of these arms. The fingers will provide a stripping action and a beating action in addition to the beating action provided by the arms 29 which support them. Since the fingers 30–30' extend substantially parallel to the axis of the arms which support them, they will not snag the cordon wires.

The cordon wire strikers 49–49' are essentially semi-cylindrical yieldable metal shells which can produce a good impact on the cordon wires but may also yield slightly if required. These members are fabricated from sixteen gauge stainless steel, but can be fabricated from any suitable stock. The semi-cylindrical shape produces good penetration through the vines while minimizing damage to the vines. Angle members 93, which extend the entire length of strikers 49–49', are used to secure striker members 49–49 to arms 48 by means of bolts 94. Because of the foregoing manner of mounting, strikers 49–49' may be selectively removed from arms 48–48' to premit the latter to be used as vine beaters in single curtain harvesting.

Figure 5:
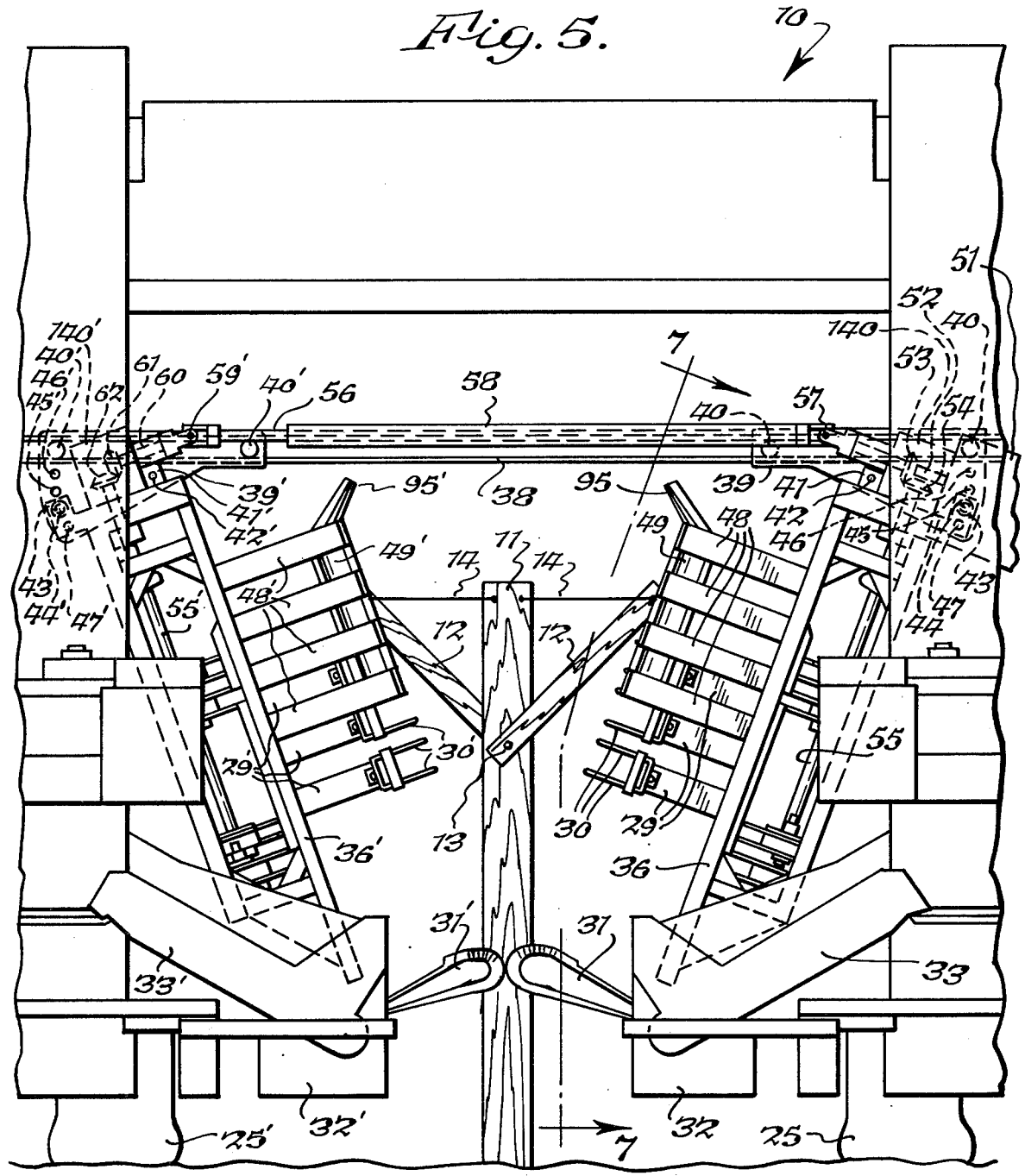
FIG. 5 is a fragmentary view taken from the rear of the harvester, that is, from the right of FIG. 1, and showing the relationship between the beater arms, the wire strikers, and a supporting post.

As can be visualized from FIG. 5, each set of arms 29–29' and the associated fingers 30–30' move in unison and attack the curtains hanging downwardly from cordon wires 16. The striker members 49–49' will strike the cordon wires 16 to set up a shock therein which aids in loosening the grapes. The cordon wires are struck within about 6 inches to each side of the vertical midpoint of members 49–49', which are approximately 2 feet long, so as to insure that at least some portion thereof strikes the cordon wires, especially considering that the wires will usually drop about 12 inches between adjacent points of support by arms 12. In addition, there is an inwardly extending cap member 95-95' at the top of each striker member 49-49', respectively, as can best be seen from FIG. 5. This cap member is for the purpose of preventing the cordon wire from riding over either member 49 or 49' and thus will prevent the wires from being snagged by the tops of members 49-49.

It is also to be noted that there is an overlap in the vertical direction between the lowermost portion of strikers 49-49' and the upper beater arms 29-29', respectively. This insures that all portions of the curtains are struck and that there is no portion of the curtain which is not engaged. This overlap is especially desired near the cordon wires because it is in this area that the least amount of movement of the vines can be effected and therefore the grapes will tend to adhere most tenaciously at such points. The striking of the wires by members 49-49' has been found to have a tendency to loosen the grapes in advance of their being struck by beater arms 29-29' and thus the beating action by arms 29-29' is more efficient in stripping the grapes.

Thus the grapes near the cordon wires 16 and the posts 11 and arms 12 are removed by striking the wires 16, and the grapes on the curtains are removed by a combination of wire agitation, stripping by the fingers 30-30' and physical attack of the arms 29-29' and fingers 30-30'.

By way of example, the grape harvester 10 travels along the rows of vines at a rate of approximately 2.5 miles per hour. The arms 29-29' and 48-48' have a frequency of 340 strokes per minute. Thus, the end of each of the arms 29-29' will effect a striking action approximately every 0.6 of each foot of length of the cordon wire. In addition, the ends of the arms 48-48' on each side of the machine are spaced from arms 29-29' so that they will not strike the same point as the ends of the arms 29-29' so that the vines and the cordon wires are struck at distances along their length which is less than 0.6 of a foot, thereby insuring relatively complete coverage of the vines. In addition, it is to be noted that the arms have a relatively large arcuate swing at their outer ends, and this insures that there will be good penetration of the vines by arms 29-29' and good impact and lateral and upward movement of the cordon wires by means of strikers 49-49'.

While the various eccentrics have been described as being 180° out of phase, it will be appreciated that they can be angularly adjusted on their shafts to produce any timed relationship of the arms which may be desired for any reason. In this respect, the opposed arms 29-29' can be caused to strike the spaced vines simultaneously as well as alternately. The same is true of the opposed beaters 49-49'. In addition, the eccentrics can be adusted to be 90° out of phase so that there is a sequential beating of the vines and striking of the wires. More specifically in this respect, the eccentrics can be set up so that arms 29 will beat the vines first followed by arms 29', then striker 49 will strike the wire 16 followed by striker 49'. Thus, the sequence will be 29-29'-49-49'. By suitable adjustment of the eccentrics the sequence can be changed to 29-49'-29'-49, or to any other desired sequence. It has been found that the sequential beating and striking produces increased picking efficiency. In addition, if desired the eccentrics may be adjusted to other positions which are not 90° apart to provide a sequential action with any desired time relationship of the arms. Furthermore, while the alternate striking described in detail above discloses one beat by each of the arms, by the use of suitable linkage, a plurality of beats by each of the arms can be produced, and thus there might be an alternating sequence of a plurality of beats by each arm.

While the foregoing specific description has been directed primarily to harvesting grapes from a Geneva double curtain formation, the harvester of the present invention can also be used with T-top formations and slant-top formations, as well as the single curtain formations descussed previously. The T-top formation consists of spaced posts having straight cross members attached centrally to the tops of the spaced posts, with cordon wires attached to the outer ends of the horizontal tops. The slant-top formation is similar to the T-top except that the top member is slanted, rather than horizontal, but it also carries spaced cordon wires. The single curtain formation, as noted above, is one in which wires are attached between spaced posts to support the grapevines. It will readily be appreciated that the T-top and slant-top formations are similar to the Geneva double curtain in the sense that they include horizontally spaced cordon wires between which the grape growth is concentrated. In harvesting from T-top and slant-top formations, the wire strikers function in the same manner as noted above, and the vine beaters 29-29' may or may not be used, depending on whether there is any appreciable growth in the nature of spaced curtains. If there are no curtains, arms 29-29' may be removed from the machine. Insofar as the single curtain formation is concerned, the harvesting can be effected by utilizing only the wire strikers 49-49' to strike the wires to thereby cause grapes to be detached from the vines, or the harvesting may be effected by the use of arms 29-29' and 48-48' only, with no wire strikers mounted on the latter. When strikers 49-49' and 149-149' are used, because of their length, the wire will always be contacted, notwithstanding its catenary drop between adjacent posts. However, for single curtain harvesting, the angle of the modules are adjusted so that they extend more closely toward the vertical. Furthermore, relative to single curtain harvesting, both the beaters 29-29' and the strikers 49-49' can be used in combination, with the beaters attacking the portions of the grapevine formation below the upper wire and the wire strikers striking the uppermost wire which supports the vines. In applications where the arms 29-29' are not required, as noted above, they may be removed from the machine, leaving only wire strikers 49-49'. However, if desired for use with any of the above-mentioned vine formations, an additional pair of wire strikers 149-149' may be mounted on arms 29-29', respectively, instead of fingers 30-30', as shown dotted in FIG. 8. Strikers 149 and 149' may be identical to strikers 49 and 49', respectively, and may be mounted in the same manner. The elevation of arms 29-29' may be adjusted so that strikers 149-149' and 49-49' are at substantially the same elevation. This can be done because arms 29-29' can be mounted at any elevation on bellcrank levers 75-75'.

By the selective mounting and demounting of wire strikers 49-49' and 149-149' from arms 48-48' and 29-29', respectively, harvester 10 may be converted simply and quickly for harvesting different vine formations. More specifically, the harvester can be converted from one which operates solely by vine beating, by using arms 29-29' and 48-48', without wire strikers 49-49' and 149-149' thereon, to one which operates solely by wire striking, or to one which operates by a combination of both vine-beating and wire-striking, as described in detail above.

Furthermore, while the above description has referred to vine beaters, this term is to be understood as meaning any structure for physically engaging the vines either by the arms 29-29' and 48-48' directly or by fingers 30-30' mounted at the ends of any of the foregoing arms, and, as noted above, such elements of structure are considered vine-engaging means.

While preferred embodiments of the present invention have been disclosed, it will be appreciated that it is not limited thereto but may be otherwise embodied within the scope of the following claims.

What is claimed is:

1. A grape harvester for grapes grown on first and second vines in the form of curtains hanging from laterally spaced first and second cordon wires comprising a frame, first and second vine engaging means engaging said first and second curtains, first mounting means for mounting said first and second vine engaging means on said frame, first driving means coupled to said first and second vine engaging means for driving said first and second vine engaging means to cause said first and second vine engaging means to engage said first and second curtains to harvest grapes therefrom, respectively, first and second wire striker means for purposely striking said cordon wires, second mounting means mounting said first and second wire striker means on said frame, and second driving means coupled to said first and second wire striker means for causing said first and second wire striker means to strike said first and second wires, respectively, to thereby produce a combined vine-engaging and wire-striking action to remove grapes from said vines.

2. A grape harvester as set forth in claim 1 wherein said second driving means includes means for causing said first and second wire striker means to strike said first and second wires in timed relationship to the engaging of said first and second curtains by said first and second vine engaging means.

3. A grape harvester as set forth in claim 1 wherein said first mounting means includes means for causing said first and second vine engaging means to engage said first and second curtains with a motion having both a vertical upward component and a horizontal component to thereby remove grapes therefrom.

4. A grape harvester as set forth in claim 3 wherein said vine engaging means comprise elongated arms having first and second ends and wherein said first mounting means comprise first and second pivot means inclined downwardly and inwardly relative to each other for mounting said first ends of said vine engaging means, said first ends being located toward the front of said harvester, and wherein said second ends are free, said free ends of said elongated arms extending rearwardly and converging downwardly toward each other.

5. A grape harvester as set forth in claim 4 wherein said first driving means include means for pivoting said first and second vine engaging means simultaneously in the same direction.

6. A grape harvester as set forth in claim 1 wherein said first vine engaging means and said first striker means are on one side of said harvester and wherein said second vine engaging means and said second striker means are on the opposite side of said harvester, and wherein said first driving means and said second driving means are synchronized to cause said first vine engaging means and said second striker means to substantially simultaneously reach their most inward travel toward said first curtain and said second wire, respectively, and to cause said second vine engaging means and said first striker means to substantially simultaneously reach their most inward travel toward said second curtain and said first wire simultaneously.

7. A grape harvester as set forth in claim 6 wherein said vine-engaging means comprise elongated arms having first and second ends and wherein said first mounting means comprise first and second pivot means inclined downwardly and inwardly relative to each other for mounting said first ends of said elongated arms at a position located toward the front of said harvester and to cause said second ends of said first and second elongated arms to extend rearwardly and converge downwardly toward each other.

8. A grape harvester as set forth in claim 7 wherein each of said first and second vine engaging means comprise a plurality of substantially parallel arms, and a plurality of substantially parallel fingers extending rearwardly from and substantially in line with said arms.

9. A grape harvester as set forth in claim 1 wherein said first and second striker means comprise first and second elongated members, and wherein said second mounting means comprise first and second pivot means inclined downwardly and inwardly relative to each other.

10. A grape harvester as set forth in claim 9 wherein said first and second elongated members have rounded outer surfaces and wherein said second mounting means includes first and second arm means having first end portions mounted on said first and second pivot means, respectively, and having second end portions mounting said first and second elongated members.

11. A grape harvester as set forth in claim 1 wherein said first and second wire-striker means comprise first and second elongated members and wherein said second mounting means include means for causing said first and second elongated members to strike said first and second wires, respectively, with a force which has a vertical upward component and a horizontal component.

12. A grape harvester as set forth in claim 10 wherein said vine-engaging means comprise elongated arms having first and second ends and wherein said first mounting means comprise third and fourth pivot means mounting said first ends of said elongated arms toward the front of said harvester to cause said second ends of said elongated arms to extend rearwardly and converge downwardly toward each other.

13. A grape harvester as set forth in claim 1 wherein said first and second vine engaging means are located toward the front of said harvester and wherein said first and second striker means are located toward the rear of said harvester.

14. A grape harvester as set forth in claim 1 wherein said first and second vine engaging means are at an elevation which is lower than the elevation of said first and second striker means.

15. A grape harvester as set forth in claim 14 wherein the upper portion of said first and second vine engaging means and the lower portion of said first and second striker means lie at a common elevation.

16. A grape harvester as set forth in claim 3 wherein said second mounting means include means for causing said first and second wire striker means to strike said first and second wires, respectively, with a force which has a vertical upward component and a horizontal component.

17. A grape harvester as set forth in claim 1 including means for converting said first and second wire striker means to vine engaging means.

18. A grape harvester as set forth in claim 1 including means for converting said first and second vine engaging means to wire striking means.

19. A grape harvester for harvesting grapes from grapevines suspended from wires comprising a frame, first and second spaced wire striking means for purposely striking said wires, mounting means mounting said first and second wire striking means on said frame and on opposite sides of a vine formation, third and fourth wire striker means for purposely striking said wire, second mounting means mounting said third and fourth wire striking means on said frame and on opposite sides of said vine formation and spaced along the longitudial axis of said frame from said first and second wire striker means, and means for driving said wire striking means toward and away from wires which support grapevines.

20. A grape harvester as set forth in claim 19 wherein said wire striker means comprise elongated rounded members having longitudial axes which extend transversely to said wires.

21. A harvester for harvesting from a vine formation extending in a row and supported by a wire comprising a frame, vine engaging means, first mounting means mounting said vine engaging means on said frame, first driving means for driving said vine engaging means into engagement with said vine formation to harvest grapes therefrom, wire striker means for purposely striking said wire, second mounting means mounting said wire striker means on said frame, and second driving means for driving said wire striking means into engagement with said wire to thereby produce a combined vine-engaging and wire-striking action to effect harvesting from said vine formation.

22. A harvester as set forth in claim 21 wherein said second mounting means comprises second vine engaging means, and means for removably mounting said wire striker means on said second vine engaging means.

23. A grape harvester for harvesting grapes from grapevines supported on a wire comprising a frame, vine engaging means on said frame for engaging said grapevines to harvest grapes therefrom, wire striker means for purposely striking said wire, and means selectively mounting said wire striker means on said vine engaging means to convert said vine engaging means to wire striking means.

24. A grape harvester as set forth in claim 23 wherein said vine engaging means comprises elongated arm means, and wherein said wire striker means comprises an elongated member having a longitudinal axis which extends transversely to a wire which supports said grapevine.

25. A grape harvester as set forth in claim 24 wherein said elongated member is tubular, and wherein said arm means comprises a plurality of arms, and wherein said elongated member is fastened to said plurality of said arms.

26. A grape harvester for grapes grown on first and second vines in the form of curtains hanging from laterally spaced first and second cordon wires comprising a frame, first and second vine-engaging means for engaging said first and second curtains to harvest grapes therefrom, first mounting means mounting said first and second vine-engaging means on said frame, first and second wire-striker means for purposely striking said cordon wires, second mounting means mounting said first and second wirestriker means on said frame, and driving means coupled to said first and second wire striker means for causing said first and second wire-striker means to strike said first and second wires, respectively, to thereby produce a combined vine-engaging and wire-striking action to remove grapes from said vines.

27. A grape harvester as set forth in claim 26 wherein said second mounting means includes means for causing said first and second wire-striker means to strike said first and second wires with a motion having both a vertical upward component and a horizontal component.

28. A grape harvester as set forth in claim 27 wherein said vine-engaging means comprise first and second rearwardly extending elongated arms having first ends mounted toward the front of said frame and second ends extending toward the rear of said frame, and wherein said first mounting means cause said second ends of said first and second rearwardly extending arms to be inclined downwardly and inwardly relative to each other.

* * * * *

UNITED STATES PATENT OFFICE
CERTIFICATE OF CORRECTION

PATENT NO. : 4,022,001
DATED : May 10, 1977
INVENTOR(S) : Charles G. Burton

It is certified that error appears in the above-identified patent and that said Letters Patent are hereby corrected as shown below:

```
Column 1, line 12, change "or" to --to--;
          line 19, change "graps" to --grapes--;
Column 3, line 60, delete "to action";
Column 5, line 20, change "spline" to --splined--;
Column 6, line 57, change "premit" to --permit--;
Column 7, line 9,  change "49-49" to --49-49'--;
Column 9, line 21, (claim 1), after "means" insert --for--;
          line 22, (claim 1), delete "for".
```

Signed and Sealed this twenty-sixth Day of July 1977

[SEAL]

Attest:

RUTH C. MASON
Attesting Officer

C. MARSHALL DANN
Commissioner of Patents and Trademarks